United States Patent
Thantry et al.

(10) Patent No.: US 10,958,770 B2
(45) Date of Patent: Mar. 23, 2021

(54) REALIZATION OF A PROGRAMMABLE FORWARDING PIPELINE THROUGH PACKET HEADER SUMMARIES IN A DATA PROCESSING UNIT

(71) Applicant: Fungible, Inc., Santa Clara, CA (US)

(72) Inventors: Hariharan Lakshminarayanan Thantry, Fremont, CA (US); Srihari Raju Vegesna, San Jose, CA (US); Stimit Kishor Oak, San Jose, CA (US); Vikas Minglani, Cupertino, CA (US); Rohit Sunkam Ramanujam, Sunnyvale, CA (US); John David Huber, San Diego, CA (US); Deepak Goel, San Jose, CA (US)

(73) Assignee: Fungible, Inc., Santa Clara, CA (US)

( * ) Notice: Subject to any disclaimer, the term of this patent is extended or adjusted under 35 U.S.C. 154(b) by 58 days.

(21) Appl. No.: 16/160,609

(22) Filed: Oct. 15, 2018

(65) Prior Publication Data

US 2020/0120191 A1    Apr. 16, 2020

(51) Int. Cl.
*H04L 29/06* (2006.01)
*H04L 12/741* (2013.01)

(52) U.S. Cl.
CPC ............ *H04L 69/22* (2013.01); *H04L 45/745* (2013.01)

(58) Field of Classification Search
CPC ... H04L 45/74; H04L 41/0803; H04L 12/462; H04L 41/12; H04L 45/38; H04L 45/52;
(Continued)

(56) References Cited

U.S. PATENT DOCUMENTS 7,187,694 B1    3/2007   Liao
8,472,452 B2    6/2013   Goyal et al.
(Continued)

FOREIGN PATENT DOCUMENTS

WO    2013019981 A1    2/2013
WO    2013019996 A1    2/2013
(Continued)

OTHER PUBLICATIONS

Kozanitis et al., "Leaping Multiple Headers in a Single Bound: Wire-Speed Parsing Using the Kangaroo System," INFOCOM'10 Proceedings of the 29th conference on Information communications, Mar. 14, 2010, 9 pages.
(Continued)

*Primary Examiner* — Natasha W Cosme
(74) *Attorney, Agent, or Firm* — Shumaker & Sieffert, P.A.

(57) ABSTRACT

This disclosure describes techniques that include storing, during parsing of a data unit or a network packet, information (i.e., "summary information") that identifies how the network packet has been process and/or other aspects of the parsing process. In one example, this disclosure describes a method that includes parsing a packet header from a data unit, wherein parsing the packet header includes storing in result vector storage each of a plurality of data items derived from the packet header, the result vector storage having a result vector format defining fields within the result vector storage for storing each of the plurality of data items; storing in template storage, for each of the plurality of data items, summary information about the plurality of data items stored in the result vector storage; and processing, by the packet-processing integrated circuit and based on the summary information and the plurality of data items, the network packet.

20 Claims, 6 Drawing Sheets

(58) Field of Classification Search
CPC ......... H04L 45/60; H04L 45/64; H04L 45/66;
H04L 45/7453; H04L 45/7457; H04L
47/21; H04L 47/2441; H04L 63/0236;
H04L 12/4625; H04L 41/0672; H04L
41/084; H04L 41/085; H04L 41/0853;
H04L 41/5019
See application file for complete search history.

(56) References Cited

U.S. PATENT DOCUMENTS

| | | | |
|---|---|---|---|
| 8,606,959 | B2 | 12/2013 | Goyal et al. |
| 8,711,861 | B2 | 4/2014 | Goyal et al. |
| 8,719,331 | B2 | 5/2014 | Goyal et al. |
| 8,923,306 | B2 | 12/2014 | Bouchard et al. |
| 8,934,488 | B2 | 1/2015 | Goyal et al. |
| 8,937,952 | B2 | 1/2015 | Goyal et al. |
| 8,937,954 | B2 | 1/2015 | Goyal et al. |
| 8,954,700 | B2 | 2/2015 | Ansari et al. |
| 8,995,449 | B2 | 3/2015 | Goyal et al. |
| 9,031,075 | B2 | 5/2015 | Goyal et al. |
| 9,130,819 | B2 | 9/2015 | Pangbom et al. |
| 9,137,340 | B2 | 9/2015 | Goyal et al. |
| 9,191,321 | B2 | 11/2015 | Goyal et al. |
| 9,195,939 | B1 | 11/2015 | Goyal et al. |
| 9,208,438 | B2 | 12/2015 | Goyal et al. |
| 9,225,643 | B2 | 12/2015 | Goyal et al. |
| 9,268,855 | B2 | 2/2016 | Goyal et al. |
| 9,275,336 | B2 | 3/2016 | Goyal et al. |
| 9,319,316 | B2 | 4/2016 | Ansari et al. |
| 9,344,366 | B2 | 5/2016 | Bouchard et al. |
| 9,391,892 | B2 | 7/2016 | Ansari et al. |
| 9,432,284 | B2 | 8/2016 | Goyal et al. |
| 9,497,117 | B2 | 11/2016 | Goyal et al. |
| 9,525,630 | B2 | 12/2016 | Ansari et al. |
| 9,531,647 | B1 | 12/2016 | Goyal et al. |
| 9,531,690 | B2 | 12/2016 | Ansari et al. |
| 9,531,723 | B2 | 12/2016 | Bouchard et al. |
| 9,544,402 | B2 | 1/2017 | Worrell et al. |
| 9,595,003 | B1 | 3/2017 | Bullis et al. |
| 9,596,222 | B2 | 3/2017 | Goyal et al. |
| 9,614,762 | B2 | 4/2017 | Goyal et al. |
| 9,647,947 | B2 | 5/2017 | Goyal et al. |
| 9,729,527 | B2 | 8/2017 | Goyal et al. |
| 9,866,540 | B2 | 1/2018 | Bouchard et al. |
| 10,565,112 | B2 | 2/2020 | Noureddine et al. |
| 2005/0165966 | A1 | 7/2005 | Gai |
| 2006/0010193 | A1 | 1/2006 | Sikdar et al. |
| 2011/0116507 | A1 | 5/2011 | Pais et al. |
| 2013/0282766 | A1 | 10/2013 | Goyal et al. |
| 2014/0214159 | A1 | 7/2014 | Vidlund et al. |
| 2014/0369363 | A1* | 12/2014 | Hutchison ............. H04L 45/745 370/474 |
| 2016/0191306 | A1 | 6/2016 | Gasparakis et al. |
| 2017/0063690 | A1 | 3/2017 | Bosshart |
| 2018/0293168 | A1 | 10/2018 | Noureddine et al. |
| 2019/0012278 | A1 | 1/2019 | Sindhu et al. |
| 2019/0013965 | A1 | 1/2019 | Sindhu et al. |
| 2019/0104206 | A1 | 4/2019 | Goel et al. |
| 2019/0289102 | A1 | 9/2019 | Goel et al. |
| 2019/0379770 | A1 | 12/2019 | Thantry et al. |
| 2020/0183841 | A1 | 6/2020 | Noureddine et al. |

FOREIGN PATENT DOCUMENTS

| | | |
|---|---|---|
| WO | 2013020001 A1 | 2/2013 |
| WO | 2013020002 A1 | 2/2013 |
| WO | 2013020003 A1 | 2/2013 |

OTHER PUBLICATIONS

Tsai et al., "A Flexible Wildcard-Pattern Matching Accelerator via Simultaneous Discrete Finite Automata," IEEE Transactions on Very Large Scale Integration (VLSI) Systems, vol. 25, No. 12, Dec. 2017, pp. 3302-3316.

Alicherry et al., "High Speed Pattern Matching for Network IDS/IPS," Proceedings of IEEE International Conference on Netwok Protocols, Nov. 2006, pp. 187-196.

International Search Report and Written Opinion of International Application No. PCT/US2019/056129, dated Jan. 23, 2020, 13 pp.

U.S. Appl. No. 62/642,798, filed Mar. 14, 2018, naming inventors Goel et al.

U.S. Appl. No. 62/682,695, filed Jun. 8, 2018, naming inventors Thantry et al.

Bosshart et al., "Forwarding Metamorphosis: Fast Programmable Match-Action Processing in Hardware for SDN," Proceedings of the ACM SIGCOMM 2013 conference on SIGCOMM, Aug. 12-16, 2013, 12 pp.

Gibb et al., "Design Principles for Packet Parsers," Architectures for Networking and Communications Systems, IEEE, Oct. 21-22, 2013, 12 pp.

U.S. Appl. No. 16/877,050, filed May 15, 2020, naming inventors Sindhu et al.

U.S. Appl. No. 16/808,026, filed Mar. 3, 2020, naming inventors Goel et al.

\* cited by examiner

| R0 value | Headers |
|---|---|
| 0000 | Ethernet only |
| 0001 | Ethernet + VLAN |
| 0010,0011 | Invalid |
| 0100 | Ethernet + IPv4 |
| 0101 | Ethernet + VLAN + IPv4 |
| 0110,0111 | Invalid |
| 1000 | Ethernet + IPv6 |
| 1001 | Ethernet + VLAN + IPv6 |
| 1010,1011,1100,...,1111 | Invalid |

| R0 value | Field_name/Byte loc | Field_Name/Byteloc | Field_Name/Byteloc |
|---|---|---|---|
| 0x01 mask 0xC0 (v4) | eth.dstAddr(0..5) | vlan.VID(6..7) | v4.dstAddr(8..12) |
| 0x10 mask 0xC0 (v6) | eth.dstAddr(0..5) | vlan.VID(6..7) | v6.dstAddr(8..24) |

REALIZATION OF A PROGRAMMABLE FORWARDING PIPELINE THROUGH PACKET HEADER SUMMARIES IN A DATA PROCESSING UNIT

TECHNICAL FIELD

This disclosure relates to processing data units and/or packets of information, for example, in the fields of networking and packet header parsing and forwarding.

BACKGROUND

A computer network is a collection of interconnected network devices that exchange data and share resources. In a packet-based network, the network devices communicate data by dividing the data into small blocks called packets. The packets are individually forwarded across the network from a source device to a destination device. The destination device extracts the data from the packets and assembles the data into its original form.

In some implementations, data units or packets communicated or to be communicated over the switch fabric are parsed by a state machine specific to the type of network being used and are processed by a pipeline of fixed function functional blocks.

As one example, in a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. The routers and switches operate to forward data units, e.g., packets, between the compute nodes and storage systems.

The various devices within the network that operate to form the network infrastructure, e.g., the routers, switches, gateways, security devices, and the like, often include specialized hardware-based packet processing engines for making forwarding decisions with respect to network packets. The packet forwarding engines may parse the packets using state machines specific to the type of network being used, and may include a static internal pipeline of fixed function functional blocks for processing the packets.

SUMMARY

This disclosure describes techniques in which a hardware-based data processing unit (DPU) utilizes a programmable parser template register for processing packet header sequences and machinery that uses the result as an input for realizing a programmable forwarding pipeline. As described, the techniques include storing, during parsing of a data unit or a network packet by a packet parser of the DPU, information (i.e., "summary information") that identifies attributes relating to how the network packet was parsed and/or relating other aspects of the parsing process. Such summary information can be used, in some examples, as part of elements of the DPU that process and/or modify such packets, such as within the internal forwarding pipeline of the DPU.

Techniques in accordance with one or more aspects of the present disclosure may, for parsing systems that extract and store information about the network packet, enable a compiler to efficiently summarize packet header sequences within an internal storage element (e.g., a template register) of the DPU (or a bus or other structure). Further, the summary information can be used by the compiler to perform overlay allocation of packet fields in a programmer-specified parser graph and its later user in a programmer-specified forwarding pipeline to perform various lookups based on fields derived from information extracted from the network packet. Further, the summary information can be used to identify fields and storage locations for such fields in stored information extracted from the network packet. Still further, the summary information can be used to query lookup tables that are composed of multiple logical tables overlaid on one memory device and/or one device substrate. In some example implementations, parser hardware within the DPU utilizes a fixed-width register (one example of a template register) to store values (i.e., the summary information) that are updated in parts during parse graph traversal by the flexible parser as each packet is parsed.

In one example, this disclosure describes a method comprising parsing, by a computing system, a packet header from a data unit, wherein parsing the packet header includes storing in result vector storage each of a plurality of data items derived from the packet header. The result vector storage has a result vector format defining fields within the result vector storage for storing each of the plurality of data items. The method further includes storing in template storage, by the computing system and for each of the plurality of data items, summary information about the plurality of data items stored in the result vector storage. The method further includes processing, by the computing system and based on the summary information and the plurality of data items, the network packet.

In another example, an integrated circuit comprises: a storage device, processing circuitry and a pipeline, wherein the processing circuitry has access to the storage device and is configured to perform any of a parser configured to: parse a packet header from a data unit, wherein parsing the packet header includes storing in result vector storage each of a plurality of data items derived from the packet header, the result vector storage having a result vector format defining fields within the result vector storage for storing each of the plurality of data items, and store in template storage, and for each of the plurality of data items, summary information about the plurality of data items stored in the result vector storage. Further, the pipeline is defined to process the network packet based on the summary information and the plurality of data items.

DETAILED DESCRIPTION

Figure 1:
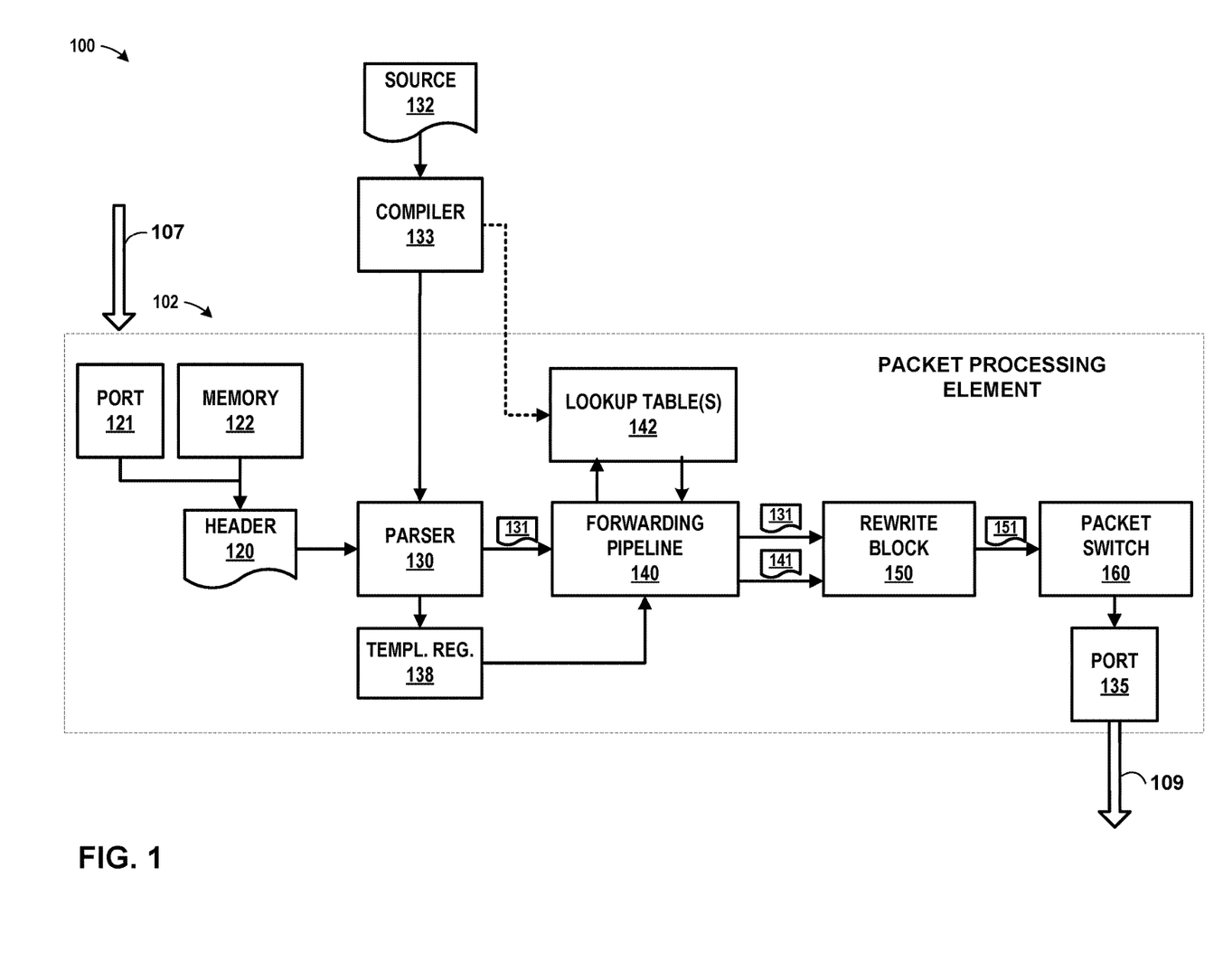
FIG. 1 is a conceptual diagram illustrating an example system for parsing, processing, and/or rewriting a network data unit, such as a packet, in accordance with one or more aspects of the present disclosure.

FIG. 1 is a conceptual diagram illustrating an example system 100 having a packet processing element 102 for parsing, processing, and/or rewriting a network data unit, such as a packet, in accordance with one or more aspects of the present disclosure. Packet processing element 102 shows an overall processing flow for data units within a networking device that may reside within a hardware-based packet processing component or components of a compute node, storage node or within a dedicated networking device, such as a router, switch, gateway or security appliance. Moreover, packet processing element 102 may, for example, represent a portion of a specialized packet-processing integrated circuit used, for example, in any such device when operating on packets for processing the packet, such as forwarding or routing the packet within a network.

In the example of FIG. 1, packet processing element 102 receives a stream of data units as input. Included within the each of the packets or other data units is a header (hereinafter "packet header 120") associated with a packet or other data unit. In the example illustrated in FIG. 1, packet processing element 102 includes one or more internal hardware-based components, such as parsers 130, one or more internal forwarding pipelines 140, one or more lookup tables 142, one or more rewrite blocks 150, and one or more packet switches 160.

Packet processing element 102 may perform processing relating to packet header 120 received by a computing device or by a dedicated networking device (e.g., an access node connected to a computing device or switch fabric). In some examples, parser 130 may parse packets and accept input at fixed or variable rates. For instance, in some examples, parser 130 may receive packet headers 120 from a stream of packets 107 arriving at a fixed rate from a port (port 121 may be included within, for example, a network device or compute node). In such an example, if parser 130 is not fast enough to process the stream of data, dropped packets may result. In other examples, parser 130 may receive packet headers 120 from a stream of packets originating from memory 122, in which case dropped packets are less likely to result if parser 130 does not parse the stream of data fast enough, since back-pressuring memory 122 may be possible.

The processing performed by packet processing element 102 may depend on a number of factors, such as the type of packet headers included within packet header 120, the forwarding type, egress stream type, and other considerations. For instance, parser 130 may parse packet headers 120 by processing a set of parsing rules. In some examples, the parsing rules may be embodied in source code 132, and parser 130 may be programmed using source code 132. In such an example, parser 130 is programmed as a result of compiler 133 processing source code 132 and appropriately configuring parser 130. In a similar, or even equivalent, example, parser 130 may be configured by presenting compiler 133 with a representation of a directed graph (e.g., parse graph 200 of FIG. 2A, as further described below). In such an example, compiler 133 interprets the representation of the directed graph, and then appropriately configures parser 130 based on the interpretation. Parser 130 may, in some cases, be configured and/or programmed in alternative ways.

In the example of FIG. 1, source code 132 includes a set of rules for parsing data units or packets, which may involve extracting fields from parser 130 and storing such fields, or information derived from such fields, to parsed result vector 131. In addition, source code 132 may also include code corresponding to programmer-directed instructions to cause parser 130 to write summary data to template register 138 during parsing of data units. The summary data may summarize some aspects of the parsing operations performed by parser 130, and as further described herein, may be used by later blocks to interpret the results of parsing and/or parsed result vector 131, and further, may be used in forwarding pipeline 140 for key constructions (e.g., by using different fields stored within parsed result vector 131).

Accordingly, in the example of FIG. 1, and in accordance with one or more aspects of the present disclosure, compiler 133 may configure parser 130. For instance, compiler 133 generates, using source code 132, executable code. Compiler 133 outputs the executable code (and/or entries in a ternary content-addressable memory, or TCAM) to parser 130, and thereby configures parser 130 to perform parsing operations. The executable code or TCAM entries generated by compiler 133 and output to parser 130 further causes parser 130 to perform operations in the manner described herein.

In some examples, compiler 133 may also configure lookup table 142 (or control logic associated with lookup table 142) to perform lookups that correspond to the data generated by parser 130. In other examples, compiler 133 may alternatively program hardware resources (e.g., a template TCAM) to realize a forwarding pipeline defined by the programmer. Parser 130 may generate parsed result vector 131 during parsing, and parsed result vector 131 may have multiple different formats, depending on the nature and/or contents of the data units fed to parser 130. Lookup table 142 may be configured by compiler 133 to recognize and adapt to each of the different formats of parsed result vector 131 and appropriately perform lookups and/or other operations that reflect the appropriate format of parsed result vector 131 in each case.

After programming, parser 130 may parse a stream of data units or packets, which may include packet header 120. For instance, in the example of FIG. 1, packet processing element 102 accesses packet header 120 (from memory 122 or from port 121) and presents packet header 120 to parser 130. Parser 130 evaluates the data within packet header 120. Parser 130 identifies fields within packet header 120. Parser 130 generates parsed result vector 131 by storing data within parsed result vector 131, where the data is extracted from and/or derived from fields included within packet header 120. In some example implementations, parsed result vector 131 may be stored within one or more devices that constitute result vector storage. Result vector storage may, in some examples, correspond to a bus between parser 130 and forwarding pipeline 140, as illustrated in FIG. 1. In other examples, parsed result vector 131 may be stored within one or more registers or other storage devices accessible by other components devices or systems (e.g., forwarding pipeline 140) for later processing.

Parser 130 may store summary information about the result vector format. For instance, still referring to the example of FIG. 1, when parser 130 parses packet header 120 (or at another time), parser 130 also writes data (i.e., "summary information") to template register 138. The summary information identifies information about parsing operations performed by parser 130. In some examples, parser 130 may update template register 138 with data as parser 130 traverses a directed graph corresponding to a parsing procedure. For some or all of the nodes in the directed graph traversed, parser 130 updates template register 138 to include information reflecting the nodes(s) that parser 130 visited when traversing the directed graph. In such an example, after the directed graph is traversed, the information stored within template register 138 may reflect or indicate the path taken by parser 130 through the directed graph as packet header 120 was parsed, thereby summarizing at least some of the parsing operations performed by parser 130 on packet header 120. In some examples, the data stored in template register 138 will represent a compact and/or concise representation of the traversed path through the directed graph, and may be used to identify fields of interest within parsed result vector 131 to later processing blocks, in the manner described herein.

In the example shown in FIG. 1, template register 138 is implemented as a separate storage area, apart from parsed result vector 131. In other examples, however, parsed result vector 131 may alternatively, or in addition, include the summary information and/or the data illustrated in FIG. 1 as being written to template register 138. In other words, in some examples, information summarizing at least some of the operations performed by parser 130 may be included within parsed result vector 131.

In general, forwarding pipeline 140 perform a series of operations based on parsed result vector 131 to process or otherwise manipulate the packet being forwarded. For instance, in the example of FIG. 1, forwarding pipeline 140 receives parsed result vector 131 and performs operations using parsed result vector 131. In some examples, parsed result vector 131 may identify to forwarding pipeline 140 a number of operations to perform and/or the set of forwarding tables to traverse. In other examples, forwarding pipeline 140 may use parsed result vector 131 to perform operations. For instance, forwarding pipeline 140 may construct one or more search keys from one or more data items included within parsed result vector 131. To identify information included within parsed result vector 131, forwarding pipeline 140 evaluates the contents of template register 138. Based on such an evaluation, forwarding pipeline 140 determines a result vector format that is associated with parsed result vector 131. The result vector format can be used to identify the data fields included within parsed result vector 131 and the locations of those data fields within parsed result vector 131. Accordingly, forwarding pipeline 140 generates one or more search keys using information from parsed result vector 131, and uses such search keys to search lookup table 142 against programmed rules. In this and other ways, forwarding pipeline 140 may use the summary information stored within template register 138 in the forwarding pipeline 140 for key construction. One specific way in which the forwarding pipeline uses the summary information is by accessing data in the parsed result vector 131 (stored as fields within the parsed result vector 131) and including such data within the constructed keys.

In some examples, lookup table 142 of FIG. 1 may be implemented by overlaying multiple logical tables (i.e., programmer-defined tables) onto the same physical substrate, which could be hardware TCAM devices or hash tables. In such an example, lookup table 142 may include one or more software or other modules for managing the allocation of entries into each of the different logical tables. Such an implementation may enable each table to be stored by overlaying multiple logical tables in the same memory space, thereby enabling sharing of the same hardware substrate. As further described in connection with FIG. 4, forwarding pipeline 140 may add an additional field to the lookup key, during lookup key construction, identifying a table to be used.

In some examples, forwarding pipeline 140 outputs metadata 141 on a bus communicating with rewrite block 150. For instance, in the example of FIG. 1, parser 130 uses results of searches within lookup table 142 to generate metadata 141. Metadata 141 may, in some examples, serve as a dynamic state describing operations to be performed on the packet, which may include operations to be performed on packet header 120. In the example shown, forwarding pipeline 140 outputs metadata 141 to rewrite block 150. Forwarding pipeline 140 also outputs parsed result vector 131 to rewrite block 150, but in some examples, forwarding pipeline 140 might not modify parsed result vector 131. In examples where parsed result vector 131 is not modified by forwarding pipeline 140, forwarding pipeline 140 may access parsed result vector 131 in read-only memory, thereby enabling such memory to be optimized for speed, since the memory does not need to support modifications to the stored data.

Rewrite block 150 may, based on parsed result vector 131, modify packet header 120. For instance, in the example of FIG. 1, rewrite block 150 receives parsed result vector 131 and metadata 141. Rewrite block 150 determines, based on parsed result vector 131, a pointer to a set of rewrite instructions that specify how packet header 120 is to be modified. Rewrite block 150 accesses packet header 120, executes the rewrite instructions, and as a result, generates new or modified data (e.g., modified packet 151). Rewrite block 150 outputs modified packet 151 to another block, such as packet switch 160, for output as output packet stream 109, e.g., via an output port 135.

In some examples, the format of parsed result vector 131 may be flexible and may be formatted differently in different contexts. For instance, depending on the field type(s) associated with any given packet header 120, the format of parsed result vector 131 may differ, and the data included within parsed result vector 131 may also differ. In one example, if packet header 120 is associated with an IPv4 packet, parser 130 may store, within parsed result vector 131 for later processing, various data items from the IPv4 packet. If packet header 120 is associated with an IPv6 packet, however, parser 130 may store, within parsed result vector 131, different data items from the IPv6 packet. Typically, a given network packet will not be characterized as both an IPv4 packet and IPv6 packet. Therefore, it might never be necessary to store both data items from an IPv4 packet and data items for an IPv6 packet. Accordingly, the format of parsed result vector 131 may be structured to efficiently allocate fields within parsed result vector 131 to minimize or reduce the size needed to store all possible permutations of data items that parser 130 might store for a given packet header 120.

Where parsed result vector 131 can be formatted by parser 130 in multiple different ways, later blocks processing parsed result vector 131 can use information about how packet header 120 was parsed to identify the format of parsed result vector 131. For instance, in the example described above in connection with FIG. 1, the summary information stored within template register 138 may sufficiently summarize the processing operations performed by parser 130 such that the format of parsed result vector 131 can be derived from the summary information stored in template register 138. Accordingly, later blocks in FIG. 1 (e.g., forwarding pipeline 140 and/or rewrite block 150) may use the contents of template register 138 to interpret parsed result vector 131, identify data fields, and perform operations based on the contents of parsed result vector 131.

FIG. 1 illustrates one example implementation of packet processing element 102. Although examples are described herein in terms of specific functional blocks, techniques described herein may apply to other systems comprising different functional blocks, and the scope of this disclosure is not limited to the configuration illustrated in FIG. 1. Accordingly, other example or alternative implementations of packet processing element 102 may be appropriate in other instances. Such implementations may include a subset of the devices and/or components included in the example of FIG. 1 and/or may include additional devices and/or components not shown in FIG. 1. Therefore, although one or more implementations of packet processing element 102 may be described with reference to FIG. 1, packet processing element 102 may be implemented in a number of different ways.

For instance, one or more devices of packet processing element 102 that may be illustrated as separate devices may alternatively be implemented as a single device; one or more components of packet processing element 102 that may be illustrated as separate components may alternatively be implemented as a single component. Also, in some examples, one or more devices of packet processing element 102 that may be illustrated as a single device may alternatively be implemented as multiple devices; one or more components of packet processing element 102 that may be illustrated as a single component may alternatively be implemented as multiple components. Each of the multiple devices and/or components may be directly coupled via wired or wireless communication and/or remotely coupled via one or more networks. Also, one or more devices or components that may be illustrated in FIG. 1 may alternatively be implemented as part of another device or component not shown in FIG. 1.

Further, certain operations, techniques, features, and/or functions may be described herein as being performed by specific components, devices, and/or modules in FIG. 1 or otherwise. In other examples, such operations, techniques, features, and/or functions may be performed by different components, devices, or modules. Accordingly, some operations, techniques, features, and/or functions that may be described herein as being attributed to one or more components, devices, or modules (e.g., in FIG. 1) may, in other examples, be attributed to other components, devices, and/or modules, even if not specifically described herein in such a manner.

In some examples, parser 130, forwarding pipeline 140, and/or other blocks illustrated in FIG. 1 may be implemented in the manner described in U.S. Provisional Patent Application No. 62/642,798, filed Mar. 14, 2018, entitled "Flexible Processing of Network Packets," the entire content of which is incorporated herein by reference. Further, packet processing element 102, including parser 130, forwarding pipeline 140, and/or other blocks illustrated in FIG. 1, may be included within a data processing unit as a programmable I/O processor specifically designed for offloading functions from compute devices, nodes, and/or servers. More details on DPUs, including their operation and example architectures, are available in U.S. patent application Ser. No. 16/031,921, filed Jul. 10, 2018, entitled "DATA PROCESSING UNIT FOR COMPUTE NODES AND STORAGE NODES," and U.S. patent application Ser. No. 16/031,676, filed Jul. 10, 2018, entitled "ACCESS NODE FOR DATA CENTERS," the entire content of each of which is incorporated herein by reference.

Through techniques in accordance with one or more aspects of the present disclosure, such as by storing, for later use, programmer-identified summary information about packet header sequences encountered or when processing a network packet to generate a result vector, packet processing element 102 may more efficiently allocate storage for data items stored within parsed result vector 131. By more efficiently allocating storage, packet processing element 102 may use less storage and require less communication between blocks illustrated in FIG. 1 because efficiently storing information within parsed result vector 131 will enable less storage to be used for parsed result vector 131, and therefore less communication will be required to transmit parsed result vector 131 between blocks.

Further, where parser 130 stores summary information about parsing operations (e.g., in template register 138), blocks following parser 130 (e.g., forwarding pipeline 140) may be able to accurately identify the format of parsed result vector 131 and/or fields within parsed result vector 131 by evaluating template register 138. By accurately identifying the format of parsed result vector 131 and/or fields within 131, packet processing element 102, in some examples, would be able to precisely identify and process packet header 120 and/or parsed result vector 131, because forwarding pipeline 140 will be able to construct lookup keys from fields within 131, and forwarding pipeline 140 may perform other processing operations with the benefit of more complete knowledge of the format of the parsed result vector 131.

Figure 4:
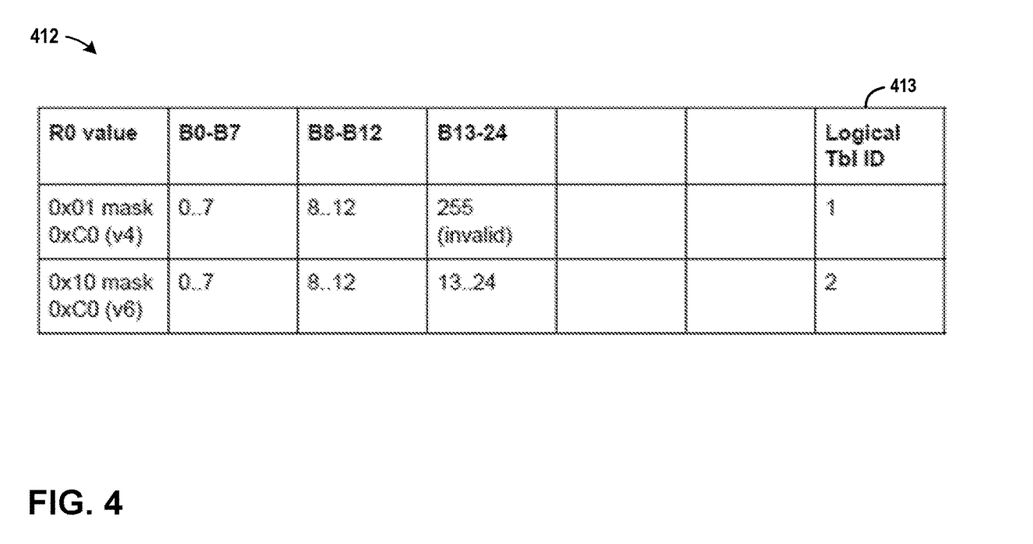
FIG. 4 is s table illustrating an example format of for table entries for lookup table, in accordance with one or more aspects of the present disclosure.

Still further, by storing information about packet header sequences during parsing, lookup tables 142 used by forwarding pipeline 140 during processing may be formatted or structured in an efficient way, as further described herein in connection with FIG. 4. By formatting or structuring lookup tables 142 efficiently, packet processing element 102 may be implemented in a simplified and/or streamlined manner, and in some examples, enable multiple lookup tables 142 to be overlaid on a single hardware substrate.

This disclosure describes techniques that relate to aspects, features, and/or concepts underlying what are known as "Reconfigurable Match Tables," as described in Bosshart et al., "Forwarding metamorphosis: fast programmable match-action processing in hardware for SDN," Proceedings of the ACM SIGCOMM 2013 conference on SIGCOMM, Aug. 12-16, 2013, Hong Kong, China, which is hereby incorporated by reference in its entirety.

Figure 2A:
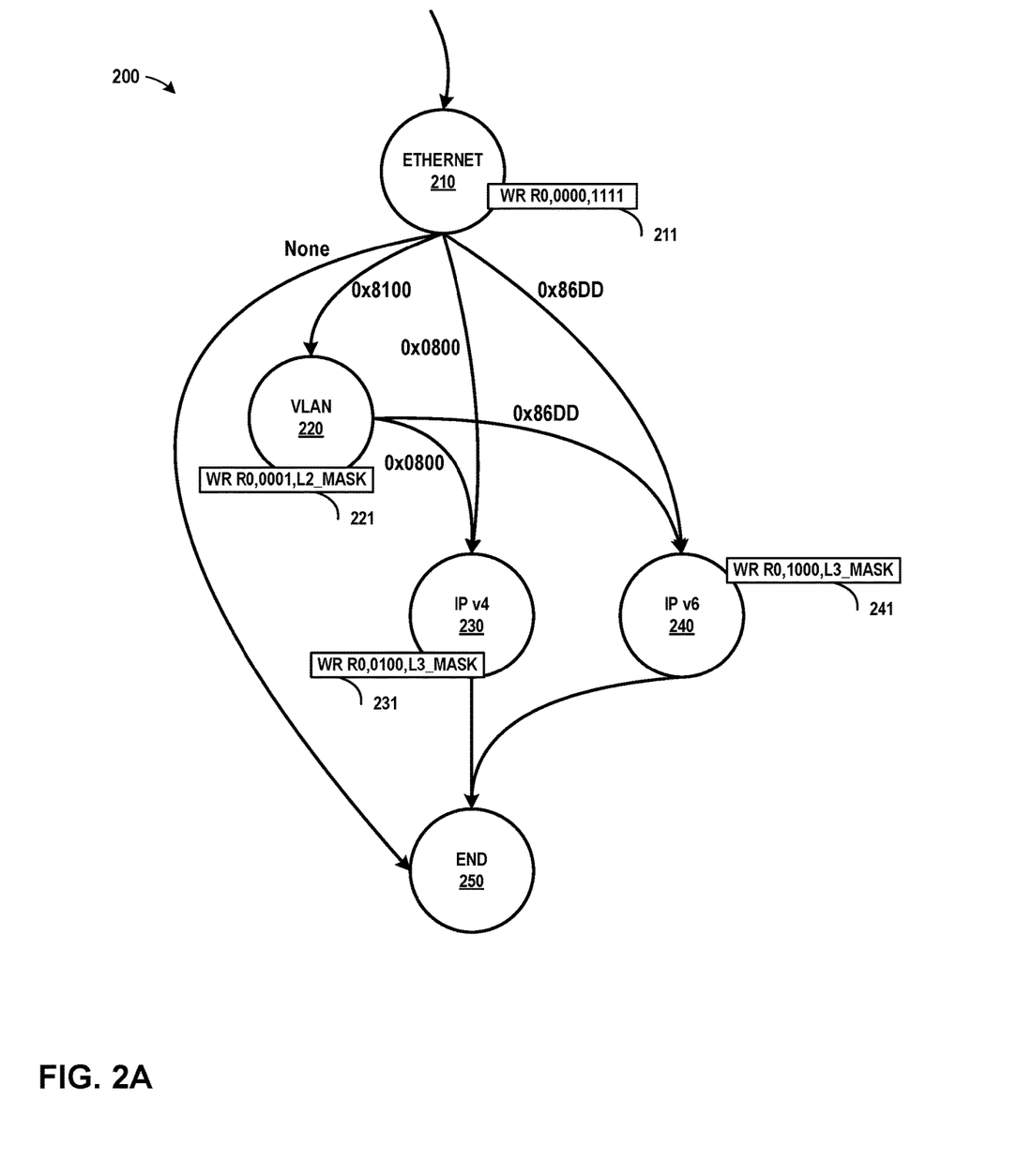
FIG. 2A is a conceptual diagram illustrating a directed graph that may be used for parsing a network packet, in accordance with one or more aspects of the present disclosure.

FIG. 2A is a conceptual diagram illustrating a directed graph that may be used for parsing a network packet, in accordance with one or more aspects of the present disclosure. Parser 130 may process or parse a packet header pursuant to the directed graph 200 ("parse graph 200") in the manner described herein. In FIG. 2A, parse graph 200 represents a set of nodes (or "vertices") corresponding to various states for parsing attributes of a network packet.

Parse graph 200 further includes a number of "directed edges," which represent transitions from one node to another. In one illustrative example, parser 130 may be configured by compiler 133, based on a representation (e.g., source code) of parse graph 200, as interpreted by compiler 133. In such an example, compiler 133 may parse the source code to generate parse graph 200, which reflects the logical rule set embodied in the source code. Once configured, the parse 130 operates in accordance with the parse graph 200.

In FIG. 2A, Ethernet node 210 represents processing operations associated with network packets that include Ethernet headers. From Ethernet node 210, parse graph 200 transitions along an edge to one of VLAN node 220, IPv4 node 230, IPv6 node 240, or End node 250, depending on data included within the packet header. From VLAN node 220, parse graph 200 transitions to either IPv4 node 230 or IPv6 node 240. IPv4 node 230 represents processing operations associated with packets that include IPv4 headers, and IPv6 node 240 represents processing operations associated with packets that include IPv6 headers. In the example of FIG. 2A, parsing of a packet header ends at End node 250.

At each node illustrated in FIG. 2A, parser 130 may perform operations, which may include writing data to parsed result vector 131 (e.g., copying fields from the packet header to parsed result vector 131). The operations may also include writing information to template register 138. Specifically, associated with some of the nodes illustrated in FIG. 2A are write instructions (i.e., write instructions 211, 221, 231, and 241). Each of write instructions 211, 221, 231, and 241 correspond to write operations performed by parser 130 when traversing a corresponding node (Ethernet node 210, VLAN node 220, IPv4 node 230, and IPv6 node 240). Each write operation writes summary information data to template register 138. In some examples, parse graph 200 of FIG. 2A assumes support in parser hardware (e.g., packet processing element 102 of FIG. 1) for a simple fixed-width register (e.g., template register 138) whose value can be updated in parts during parse graph traversal by parser 130 for each packet parsed. Supported mechanisms in FIG. 2A include a write operation (under mask) of a constant value into template register 138 that indicates information identifying a particular "{edge, node}" pair. Each {edge, node} pair may identify that a particular node was traversed during parse graph processing of packet header 120.

In the example illustrated in FIG. 2A, the summary information write operations (e.g., write instructions 211, 221, 231, and 241) are illustrated as being performed at nodes 210, 220, 230, and 240. In other examples, however, such write operations may be considered to be performed on edges (i.e., transitions) between nodes of parse graph 200. In such an example, a corresponding parse graph 200 might illustrate write operations (e.g., write instructions 211, 221, 231, 241) shown along edges or transitions between nodes.

To illustrate a specific example of a write operation that may involve writing data to template register 138, assume template register 138 is implemented as a 4-bit register in FIG. 1. A write operation corresponding to an instruction having the form "WR [Register],N_VAL,N_MASK," where "WR" signifies a write operation to the specified storage location "[Register]" using value "N_VAL" and mask "N_MASK" In an example where "[Register]" is Register "0" (i.e., "R0," which may correspond to template register 138 in FIG. 1), the write operation can be described as follows:

$$R0=(R0\&\sim N\_MASK)|(N\_VAL\&N\_MASK).$$

In the above example, R0 is updated to a value that equals a logical "OR" operation of (1) the value resulting from a logical AND of the current value of R0 and the bitwise complement of N_MASK, and (2) the value resulting from a logical AND of N_VAL and N_MASK.

In the example of FIG. 2A, two masks are used, and might be defined as follows:
L2_MASK=0b0011
L3_MASK=0b1100

In some examples, parse graph 200 of FIG. 2A processes only Ethernet, VLAN, IPv4, and IPv6 packets. In such examples, possible packet types accepted by the parse graph can be grouped into a finite number of collections. Data or summary information is written into template register 138 (e.g., during parsing) to enable later identification of packets into one of the collections. As parse graph 200 is traversed, writing to "R0" (i.e., template register 138) pursuant to the write operation described above may result in data stored within template register 138 that provides a compact representation for headers of interest that were traversed. This allows for different treatment by blocks within packet processing element 102 (e.g., forwarding pipeline 140) for different packet types, based on the final signature contained within the template register 138.

In some examples, packet processing element 102 may be implemented using one or more hash tables, content-addressable memory devices, ternary content-addressable memory (TCAM), or other devices. In other words, techniques for representing, traversing, and processing directed graphs (e.g., including parse graph 200) may be performed using a variety of hardware implementations of parser 130, forwarding pipeline 140, and/or lookup table 142, including use of one or more content-addressable memory devices or ternary content-addressable memory (TCAM) devices as the basis for (or part of) a system for traversing a directed graph to parse network streams. Further details for such an approach are available in U.S. Provisional Patent Application No. 62/682,695, filed Jun. 8, 2018, entitled "Directed Graph Traversal Using Content-Addressable Memory," the entire content of each of which is incorporated herein by reference.

In the example of FIG. 2A, and in accordance with one or more aspects of the present disclosure, parser 130 may process a packet header. For instance, referring to the example of FIG. 1 in the context of FIG. 2A, compiler 133 receives source code 132 and uses source code 132 to program, configure, and/or initialize parser 130. Parser 130 receives a stream of packets from either memory 122, port 121, or a combination of memory 122 and port 121. Parser 130 analyzes packet header 120, included within one of the data units in the stream, and parses packet header 120 pursuant to rules programmed by compiler 133, which correspond to parse graph 200 of FIG. 2A.

Parser 130 may perform operations associated with Ethernet node 210. For instance, with reference to FIG. 1 and FIG. 2A, parser 130 analyzes packet header 120 and identifies packet header 120 as including Ethernet fields. Parser 130 extracts one or more fields from packet header 120 and stores them at specific locations as determined by the compiler within parsed result vector 131. In addition, parser 130 writes to template register 138 by executing write instruction 211 associated with Ethernet node 210. In the example of FIG. 2A, the effect of write instruction 211 is to initialize template register 138 (i.e., four-bit register "R0") to all zeros.

Parser 130 may transition to another state based on the contents of packet header 120. For instance, again with reference to FIG. 1 and FIG. 2A, parser 130 analyzes the EtherType field of packet header 120 to determine whether packet header 120 includes a VLAN tag inserted into the Ethernet frame (corresponding to an EtherType value=0x8100), or whether the EtherType field has a value associated with Internet Protocol v4 (EtherType value=0x0800) or Internet Protocol version 6 (EtherType value=0x86DD). Where a VLAN tag is inserted into packet header 120, parser 130 transitions to VLAN node 220.

For packet headers 120 that include a VLAN tag, parser 130 performs operations associated with VLAN node 220. For instance, still referring to the example of FIG. 2A, parser 130 extracts one or more data items included in fields within packet header 120 associated with VLAN parsing. Parser 130 stores such data items at specific locations within parsed result vector 131. Alternatively, or in addition, parser 130 may write one or more data items derived from information within packet header 120 to specific locations within parsed result vector 131. In addition, parser 130 writes to template register 138 by executing write instruction 221. In the example of FIG. 2A, the effect of write instruction 221 is to set the least significant bit of the four-bit template register 138 to a value of "1."

Where a VLAN tag is not inserted into packet header 120, parser 130 transitions to IPv4 node 230 from Ethernet node 210 if the EtherType field indicates IPv4 (i.e., EtherType 0x0800). Similarly, from VLAN node 220, parser 130 transitions to IPv4 node 230 if the EtherType field indicates IPv4. In either case, for packet headers 120 that include an EtherType value associated with IPv4, parser 130 performs operations associated with IPv4 node 230. For instance, still referring to FIG. 2A, parser 130 extracts one or more data items relating to IPv4 included within packet header 120 and stores such data items at specific locations within parsed result vector 131. Alternatively, or in addition, parser 130 may write one or more data items derived from information within packet header 120 to specific locations within parsed result vector 131. In the example of FIG. 2A, parser 130 further writes to template register 138 by executing write instruction 231. The effect of write instruction 231 as illustrated in FIG. 2A is to set the third-least significant bit of template register 138 ("R0") to a value of "1."

Correspondingly, where a VLAN tag is not inserted into packet header 120, parser 130 transitions to IPv6 node 240 from Ethernet node 210 if the EtherType field indicates IPv6 (i.e., 0x08DD). Similarly, from VLAN node 220, parser 130 transitions to IPv6 node 240 if the EtherType field indicates IPv6. In either case, for packet headers 120 that include an EtherType value associated with IPv6, parser 130 performs operations associated with IPv6 node 240. Parser 130 extracts one or more data items relating to IPv6 included within packet header 120 and stores such data items at specific defined locations within parsed result vector 131. Alternatively, or in addition, parser 130 may write one or more data items derived from information within packet header 120 to specific defined locations within parsed result vector 131. In the example of FIG. 2A, parser 130 further writes to template register 138 by executing write instruction 241. The effect of write instruction 241 is to set the most significant bit of the four-bit template register 138 to a value of "1."

Where no VLAN tag is inserted into the Ethernet frame, and where packet header 120 does not include either IPv4 or IPv6 headers, parser 130 transitions from Ethernet node 210 to End node 250. End node 250 may perform operations associated with End node 250. In the example of FIG. 2A, no write instruction is associated with End node 250, so parser 130 does not update template register 138 when processing End node 250.

In the example of FIG. 2A, each of write instructions 211, 221, 231, and 241 represent programmer-directed updates to the summarization of packet header sequence processing. When a programmer creates source code 132, the programmer chooses various events during parsing (e.g., traversal of nodes, states, and/or transitions within parse graph 200) that are of interest, and indicates that a record of each such event be stored. In the example illustrated in FIG. 1 and FIG. 2A, the record of such events is stored by modifying template register 138. The record also enables compiler 133 to determine an efficient allocation strategy for parsed result vector 131, and further, the record enables later blocks (e.g., forwarding pipeline 140) to identify and access data stored within parsed result vector 131 for further processing.

Programmer-directed summarization of packet header sequences may be more efficient than other ways of summarizing such sequences. For instance, in an example similar to FIG. 2A, where the programmer wishes to treat VLAN and non-VLAN packets in the same way, the programmer might not include write instruction 221 in a corresponding parse graph. The resulting summary information stored in template register 138 would not differ for IPv4 packets with or without a VLAN tag. Similarly, the resulting summary information stored in template register 138 also would not differ for IPv6 packets with or without a VLAN tag. Accordingly, based on the possible or valid values stored within template register 138, compiler 133 may determine that an allocation strategy for compiler 133 should not differ at all for VLAN and non-VLAN packets, and in this sense, the programmer is determining the allocation strategy implemented by compiler 133. Without programmer-directed summarization, compiler 133 might be able to determine an efficient allocation strategy by analyzing parse graph 200 and the types of data units expected to be processed. However, in such an example compiler 133 might not capture all of the insights that a programmer could provide in a system that relies on programmer-directed summarization of header sequences.

Figure 2B:
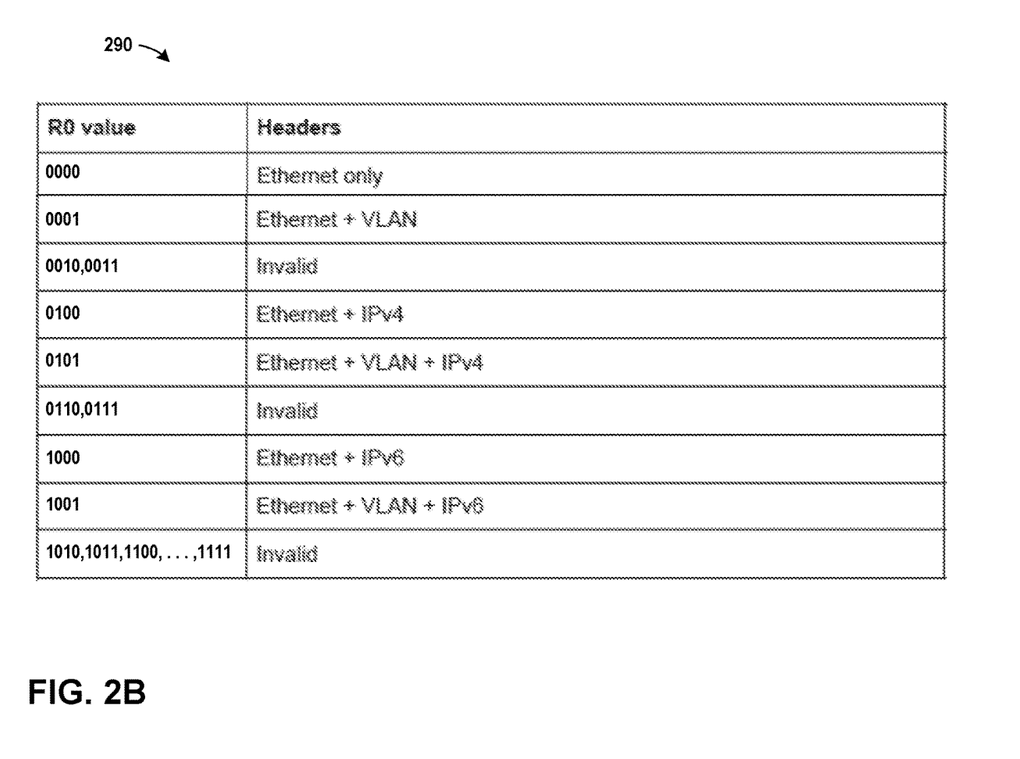
FIG. 2B illustrates an example table showing possible values of an example template register.

FIG. 2B illustrates an example table showing possible values of an example template register. In the example of FIG. 2B, table 290 illustrates possible or valid values stored in template register 138 after parsing a packet header with parse graph 200 of FIG. 2A. For instance, traversals associated with parsing data units or packets that include only Ethernet headers are valid (i.e., resulting in template register 138 storing 0000b). Also, traversals associated with packets that include Ethernet headers and either IPv4 or IPv6 packet headers are valid (i.e., 0100 and 1000). Further, these same combinations of headers that also include a VLAN tag might also occur (0001, 0101, and 1001) in the example parse graph 200 of FIG. 2A. Other combinations, however, will not result from a traversal of parse graph 200, and are therefore invalid (or not possible).

For instance, values 0010, 0111, 0110, 0111, 1010, and values greater than 1010 are invalid, since no traversal of parse graph 200 would result in such values. In other words, Ethernet node 210, which would be traversed in the example of FIG. 2A, initializes template register 138 to 0000b. And the only way to set to "1" the most significant bit in template register 138 is to traverse IPv6 node 240 (and execute write instruction 241). Yet if IPv6 node 240 is traversed, the only other node that could be traversed in FIG. 2A (besides End node 250) is VLAN node 220, thereby making "1000" and "1001" possible values stored in template register 138, but no other values with the most significant bit set to "1" would result from a parsing of parse graph 200. Accordingly, four-bit values greater than "1001" will not result from parsing parse graph 200.

Figure 3A:
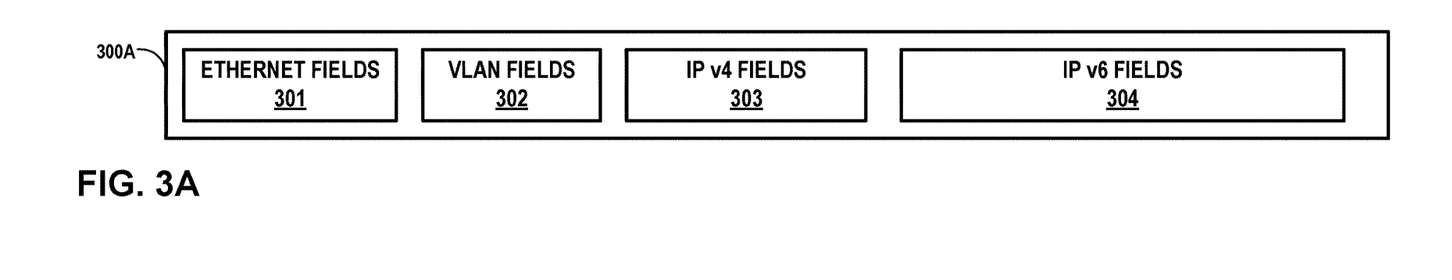
FIG. 3A is an illustration of one possible format for an example parsed result vector, in accordance with one or more aspects of the present disclosure.

FIG. 3A is an illustration of one possible format for an example parsed result vector, in accordance with one or more aspects of the present disclosure. The example of FIG. 3A illustrates result vector format 300A, which includes space for all possible data items that might be included within parsed result vector 131. In the example of FIG. 3A, result vector format 300A includes Ethernet fields 301, VLAN fields 302, IPv4 fields 303, and IPv6 fields 304.

Figure 3B:
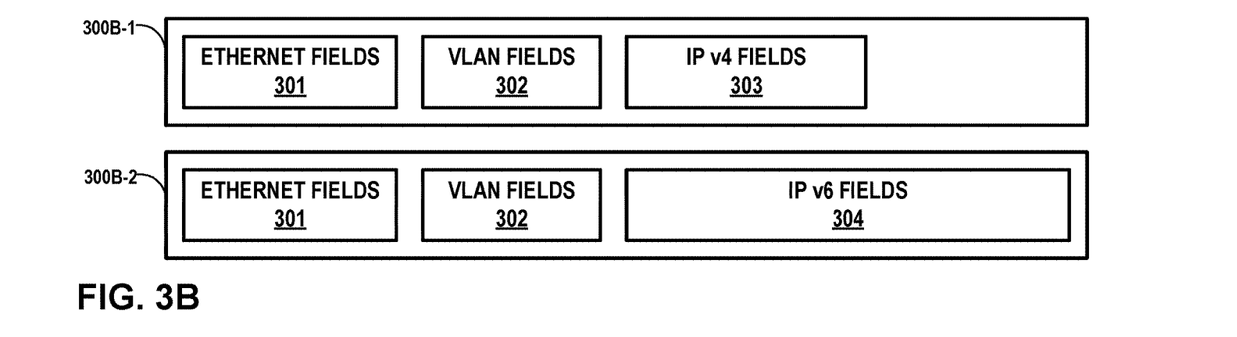
FIG. 3B is an illustration of two different formats for an example parsed result vector, which may collectively represent a more efficient allocation of storage relative to the format of FIG. 3A, in accordance with one or more aspects of the present disclosure.

FIG. 3B is an illustration of two different formats for an example parsed result vector, which may collectively represent a more efficient allocation of storage relative to the format of FIG. 3A, in accordance with one or more aspects of the present disclosure. FIG. 3B illustrates both result vector format 300B-1 and result vector format 300B-2, each differing in the fields or data items included within the result vector. Result vector format 300B-1 includes Ethernet fields 301, VLAN fields 302, and IPv4 fields 303. Result vector format 300B-2 includes Ethernet fields 301, VLAN fields 302, and IPv6 fields 304.

Accordingly, in some examples, when processing a data unit or packet, parser 130 may be programmed by compiler 133 to store data items within parsed result vector 131 in the form illustrated in FIG. 3B. For instance, with reference to FIG. 1 and FIG. 2A, compiler 133 interprets parse graph 200 of FIG. 2A, which may be provided to compiler 133 as source code 132 or in some other form. Compiler 133 determines a collection of independent allocatable nodes. Specifically, in an example consistent with FIG. 2A, compiler 133 determines, based on parse graph 200 (and table 290), that for all valid combinations of the data stored within template register 138, IPv4 packet headers and IPv6 packet headers never appear together. Compiler 133 determines that any data written to parsed result vector 131 by parser 130 in nodes corresponding to IPv4 node 230 and IPv6 node 240 are independently allocatable. Compiler 133 therefore performs an efficient allocation of fields within parsed result vector 131 and determines that two different formats for parsed result vector 131 may be used, one for IPv4 packets (result vector format 300B-1) and one for IPv6 packets (result vector format 300B-2). Once programmed by compiler 133, parser 130 parses packet headers and stores data pursuant to the two different formats illustrated in FIG. 3B.

Figure 3C:
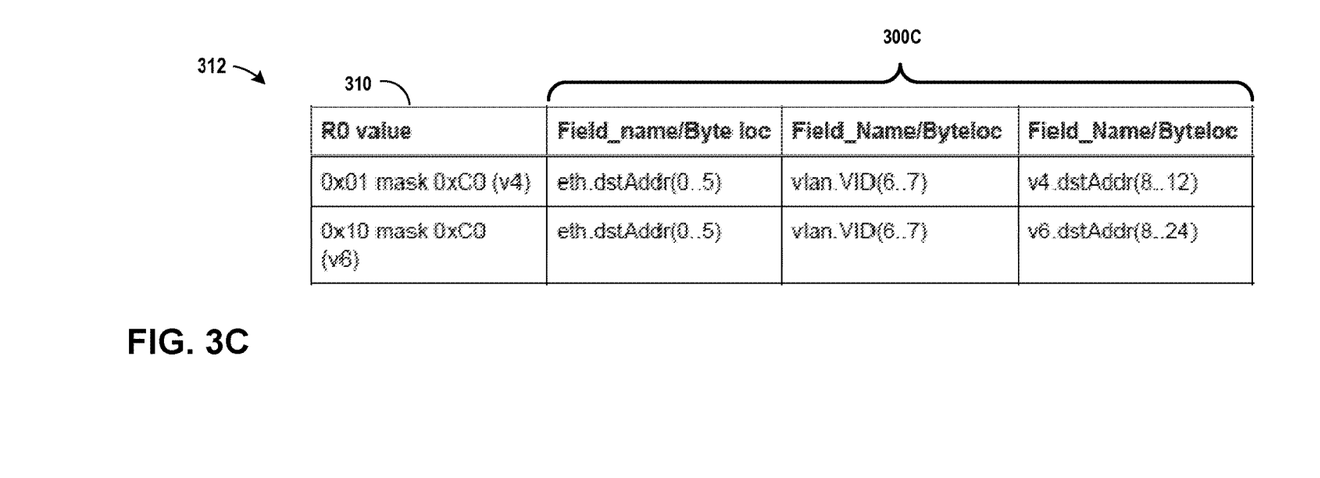
FIG. 3C illustrates an example table summarizing the locations of different fields stored within an example parsed result vector, in accordance with one or more aspects of the present disclosure.

FIG. 3C illustrates an example table summarizing the locations of different fields stored within an example parsed result vector, in accordance with one or more aspects of the present disclosure. Table 312 of FIG. 3C summarizes the locations of the fields that may be populated by parser 130 of FIG. 1, when parser 130 is configured to use result vector format 300B-1 and result vector format 300B-2 of FIG. 3B. As illustrated by the result vector formats 300C, each described in a different row of table 312, the allocations of data depend on the value stored within template register 138 ("R0") shown within template register value column 310.

In some examples, forwarding pipeline 140 may use the information illustrated in table 312 to generate a key that has logical length that differs for different types of packets. For instance, with reference to FIG. 1, forwarding pipeline 140 creates one or more keys for performing lookups within lookup table 142 (e.g., such as a TCAM or hash table). Forwarding pipeline 140 generates such keys by using data items from result vector format 300B-1 (for IPv4 packets) or from result vector format 300B-2 (for IPv6 packets). Forwarding pipeline 140 identifies the locations of those data items using the information illustrated in table 312, which forwarding pipeline 140 may derive from summary information stored in template register 138. Because result vector format 300C may differ in different contexts (e.g., IPv4 and IPv6), result vector formats 300B-1 and 300B-2 may allow for creation of flexibly-sized keys for lookups in a table (e.g., a TCAM, a hash table, or other device). In one such example, forwarding pipeline 140 may generate a key for an IPv6 packet, where the key has a physical width that is sufficient to include an IPv6 destination address. But where forwarding pipeline 140 generates a corresponding key for an IPv4 packet, the key may be the same width as one for an IPv6 packet with the IPv4 destination address stored in the same byte locations as the IPv6 destination address (even though the destination address for the IPv4 packet does not require the same number of bytes as an IPv6 packet). In such an example, lookup table 142 processes the key when performing a search by ignoring and/or not considering the excess bytes normally required for an IPv6 destination address.

FIG. 4 is a table illustrating an example format for table entries for lookup table, in accordance with one or more aspects of the present disclosure. In some examples, lookup table 142 of FIG. 1 may be implemented by overlaying different logical tables onto the same hardware substrate. In such examples, lookup table 142 may include one or more software or other modules for managing the allocation of entries into each of the different logical tables. Such an implementation may enable each table to be stored by overlaying multiple logical tables in the same memory space, thereby enabling sharing of the same hardware substrate as shown in table 412 of FIG. 4. To distinguish between entries of different logical tables, forwarding pipeline 140 may add, during lookup key construction, an additional field (i.e., a "cookie") corresponding to table identifier 413 to the lookup key used to query table 412. In the example illustrated in FIG. 4, lookup table 412 is queried using the cookie to determine whether bytes 13 through 24 contain valid data, or whether such data should be ignored.

Figure 5:
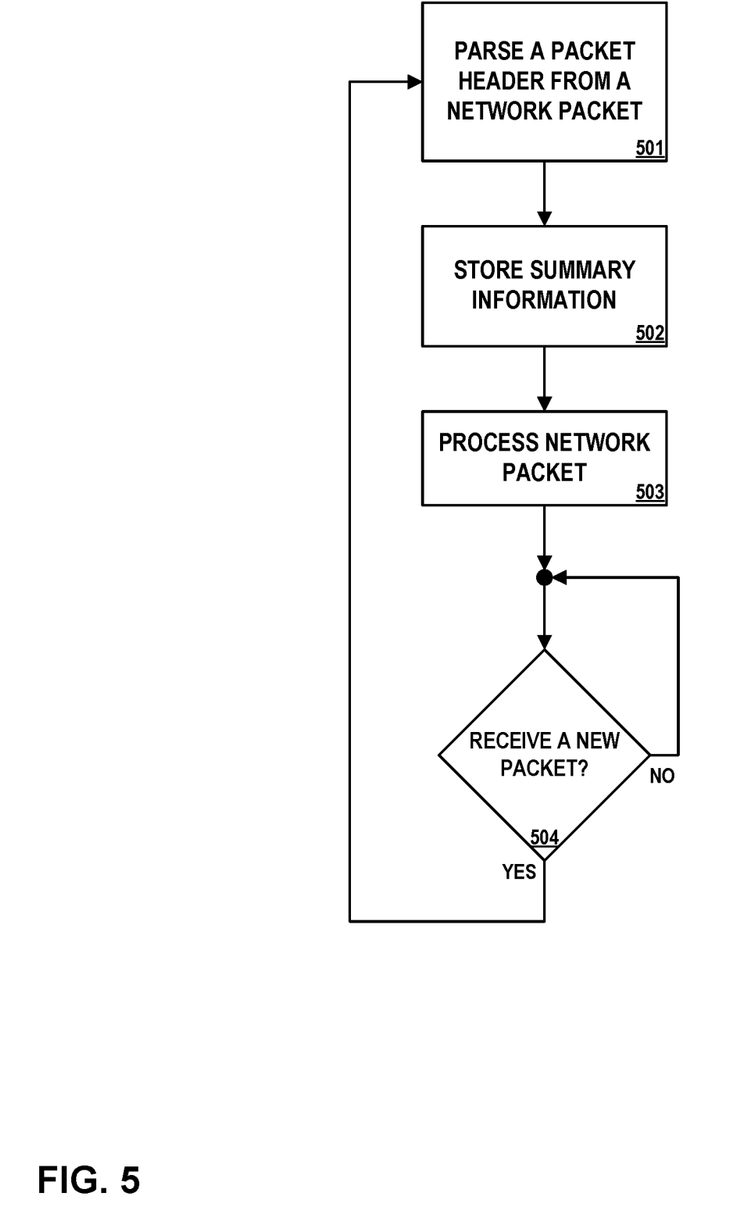
FIG. 5 is a flow diagram illustrating operations performed by an example parsing system in accordance with one or more aspects of the present disclosure.

FIG. 5 is a flow diagram illustrating operations performed by an example parsing system in accordance with one or more aspects of the present disclosure. FIG. 5 is described below within the context of packet processing element 102 of FIG. 1. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, packet processing element 102 may parse a packet header from a network packet (501). For example, with reference to FIG. 1, parser 130 of packet processing element 102 receives packet header 120 from memory 122. Parser 130 evaluates packet header 120 and identified fields within packet header 120. In some examples, parser 130 performs such an evaluation by traversing a parse graph, such as parse graph 200 of FIG. 2A, to identify and extract relevant fields included within packet header 120. Parser 130 stores, within result vector storage (e.g., parsed result vector 131 of FIG. 1), each of a plurality of data items derived from packet header 120. In some examples, the result vector storage has a flexible result vector format defining fields within the result vector storage for storing each of the data items.

Packet processing element 102 may store summary information (502). For example, referring again to FIG. 1, parser 130 stores, in template register 138, and for each of the plurality of data items, summary information about the plurality of data items. In examples where parser 130 is traversing a parse graph to perform parsing, parser 130 may perform a write operation to template register 138 for some or all of the traversed nodes (e.g., Ethernet nodes 210, 220, 230, 240 of FIG. 2A) in the parse graph.

Packet processing element 102 may process the network packet (503). For example, still referring to FIG. 1, forwarding pipeline 140 of packet processing element 102 receives parsed result vector 131 from parser 130. Forwarding pipeline 140 extracts data fields from parsed result vector 131 and constructs one or more lookup keys. To identify fields included within parsed result vector 131 and the locations of such fields, forwarding pipeline 140 evaluates and interprets the summary information stored in template register 138. Forwarding pipeline 140 may perform lookups in lookup tables 142 using the constructed keys. Forwarding pipeline 140 may output, based on the results of the lookups, metadata 141. Forwarding pipeline 140 may output to further blocks (e.g., rewrite block 150 and packet switch 160) parsed result vector 131 and metadata 141 for further processing.

Packet processing element 102 may continue processing additional packets (504). For instance, parser 130 may receive, from memory 122, a new packet header. Parser 130 may parse the new packet header by traversing parse graph 200 for the new header. Forwarding pipeline 140 may receive a parsed result vector for the new packet header, and forwarding pipeline 140 process the new packet header. Forwarding pipeline 140 may determine, based on summary information stored within template register 138, that the new parsed result vector has a different format than previously generated parsed result vector 131.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., data sources 210, client devices 220, computing systems 240, administrator devices 290, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In many of the examples described herein, techniques in accordance with one or more aspects of this disclosure are implemented through a hardware-based packet parser and forwarding pipeline. In other examples, however, aspects of this disclosure may encompass other implementations, including those that may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, optical or magnetic storage devices, flash memory, or any other medium that can be used to store desired program code in the form of instructions or data structures and that can be accessed by a computer. Also, any connection might be properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
parsing, by a hardware-based packet-processing integrated circuit, a packet header from a data unit, wherein parsing the packet header includes storing in result vector storage each of a plurality of data items derived from the packet header, the result vector storage having bit allocations for the plurality of data items that are specified by a result vector format, the result vector format being one of a plurality of result vector formats, and wherein each of the result vector formats specifies a different bit allocation for the result vector storage so that at least one set of bits within the result vector storage is used for a different field of data in each of the plurality of result vector formats;
storing in a template storage within the packet-processing integrated circuit and for each of the plurality of data items, summary information about the plurality of data items stored in the result vector storage, wherein storing summary information includes storing information about the result vector format that enables the bit allocations for the result vector format to be identified; and
processing, by the packet-processing integrated circuit and based on the summary information and the plurality of data items stored in the result vector storage, the network packet.

2. The method of claim 1,
wherein parsing the packet header includes traversing, with a packet parser of the packet-processing integrated circuit, a parse graph that includes a plurality of nodes and directed edges between each of the plurality of nodes.

3. The method of claim 1, wherein processing the network packet includes:
determining, based on the summary information and with a packet parser of the packet-processing integrated circuit, the result vector format.

4. The method of claim 1, wherein processing the network packet includes:
constructing a key from at least one of the plurality of data items stored within the result vector storage;
performing a lookup in a table, using the key, to identify lookup information; and
storing the lookup information to a metadata bus within the packet-processing integrated circuit.

5. The method of claim 4, wherein the table includes a plurality of lookup tables that each include different fields.

6. The method of claim 5, wherein the plurality of lookup tables are logical tables overlaid on one memory device within the packet-processing integrated circuit.

7. The method of claim 1, further comprising:
configuring the packet-processing integrated circuit, based on source code, to parse the packet header and store the summary information.

8. The method of claim 7, wherein configuring the packet-processing integrated circuit is performed by a compiler, and wherein configuring the packet-processing integrated circuit includes:
choosing, based on the source code, the result vector format.

9. The method of claim 8, wherein choosing the result vector format includes:

choosing a first result vector format for a first value of the summary information; and choosing a second result vector format for a second value of the summary information, wherein the first result vector format is different than the second result vector format, and wherein the first result vector format includes allocated space for a data item type not included within the second result vector format.

10. An integrated circuit comprising:

a storage device;

processing circuitry having access to the storage device and configured to:

parse a packet header from a data unit, wherein parsing the packet header includes storing in result vector storage each of a plurality of data items derived from the packet header, the result vector storage having bit allocations for the plurality of data items that are specified by a result vector format, the result vector format being one of a plurality of result vector formats, and wherein each of the result vector formats specifies a different bit allocation for the result vector storage so that at least one set of bits within the result vector storage is used for a different field of data in each of the plurality of result vector formats, and store in template storage, and for each of the plurality of data items, summary information about the plurality of data items stored in the result vector storage, wherein storing summary information includes storing information about the result vector format that enables the result vector format to be identified from among a plurality of different result vector formats; and a pipeline configured to process the network packet based on the summary information and the plurality of data items stored in the result vector storage.

11. The integrated circuit of claim 10, wherein to parse the packet header, the processing circuitry is further configured to traverse a parse graph that includes a plurality of nodes and directed edges between each of the plurality of nodes.

12. The integrated circuit of claim 10, wherein to process the network packet the pipeline is further configured to:

determine, based on the summary information, the result vector format.

13. The integrated circuit of claim 10, wherein to process the network packet, the pipeline is further configured to:

construct a key from at least one of the plurality of data items stored within the result vector storage;

perform a lookup in a table, using the key, to identify lookup information; and store the lookup information to a metadata bus within the integrated circuit.

14. The integrated circuit of claim 13, wherein the table includes a plurality of lookup tables that each include different fields.

15. The integrated circuit of claim 14, wherein the plurality of lookup tables are logical tables overlaid on one memory device within the integrated circuit.

16. The integrated circuit of claim 15, wherein the processing circuitry is further configured to:

configure the integrated circuit, based on source code, to parse the packet header and store the summary information.

17. The integrated circuit of claim 16, wherein configuring the integrated circuit is performed by a compiler that chooses, based on source code, the result vector format.

18. The integrated circuit of claim 17, wherein to choose the result vector format, the compiler is further configured to:

choose a first result vector format for a first value of the summary information; and choose a second result vector format for a second value of the summary information, wherein the first result vector format is different than the second result vector format, and wherein the first result vector format includes allocated space for a data item type not included within the second result vector format.

19. A computer-readable storage medium comprising instructions that, when executed, configure processing circuitry to:

parse a packet header from a data unit, wherein parsing the packet header includes storing in result vector storage each of a plurality of data items derived from the packet header, the result vector storage having bit allocations for the plurality of data items that are specified by a result vector format, the result vector format being one of a plurality of result vector formats, and wherein each of the result vector formats specifies a different bit allocation for the result vector storage so that at least one set of bits within the result vector storage is used for a different field of data in each of the plurality of result vector formats;

store, in a template storage and for each of the plurality of data items, summary information about the plurality of data items stored in the result vector storage, wherein storing summary information includes storing information about the result vector format that enables the result vector format to be identified from among a plurality of different result vector formats; and process, based on the summary information and the plurality of data items stored in the result vector storage, the network packet.

20. The computer-readable storage medium of claim 19, wherein to parse the packet header, the instructions further configure the processing circuitry to traverse a parse graph that includes a plurality of nodes and directed edges between each of the plurality of nodes.

* * * * *